United States Patent Office 2,758,632
Patented Aug. 14, 1956

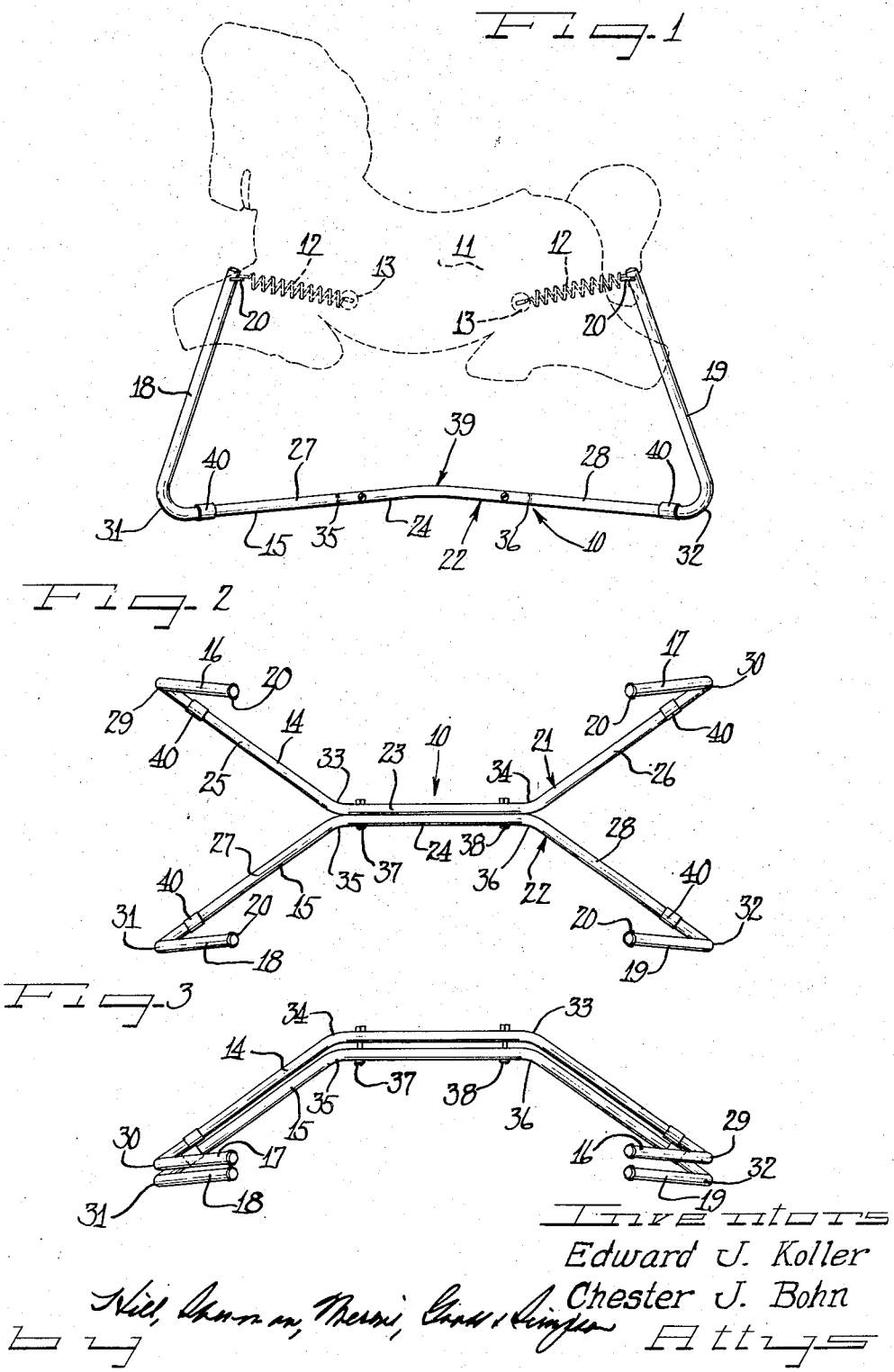

2,758,632

STAND FOR SPRING SUSPENDED HOBBY HORSE

Edward J. Koller, Collierville, Tenn., and Chester J. Bohn, St. Louis, Mo., assignors to Wonder Products Company, Collierville, Tenn., a partnership Application June 2, 1954, Serial No. 433,930

1 Claim. (Cl. 155—17)

The present invention relates to hobby horses, and still more particularly relates to a base stand for spring suspended hobby horses.

In particular, the base stand of the present invention is particularly adapted to and has most advantageous utility with a spring suspended hobby horse such as in the combination described and claimed in Patent No. 2,437,015 issued to William Baltz on March 2, 1948. In the identified patent to Baltz there is broadly described and claimed a hobby horse wherein the horse is suspended from four coil springs each of which is coupled to the horse and each of which is further coupled to a base stand whereby the horse is permitted oscillating motion in substantially all directions. By the present invention there is provided a new and improved base stand for such a hobby horse.

One of the important principal features of the base stand of the instant invention is that it is so constructed and the parts thereof are so configurated that it may be easily and compactly shipped as a relatively small package and will yet provide a sturdy and improved base stand of sufficient size to safely and conveniently support a spring suspended hobby horse. This advantage is effected by forming the base stand from a pair of symmetrically and substantially identically formed frame members which may be secured together in a juxtaposed or substantially superimposed position for convenient storage and shipment and which may be secured together in an opposed relation to form a safe and sturdy stand for the hobby horse.

In addition to the above mentioned important feature, whereby economy of transportation is greatly enhanced, the construction of the base stand of the present invention is permissive of very economical, yet improved, manufacturing.

This construction which permits a more economical manufacturing thereof is effected by forming the base stand from such a material as metal including steel or the like, and in the form of pipe or conduit or tubing or the like and by identically forming lateral halves thereof so that the entire stand is formed from a pair of substantially identically frame members. By this construction only a single form for configurating the stand need be provided and the frame members each forming one-half of the frame stand may be formed and configurated by a simple bending operation as will be described in great detail herein below.

Still another distinctive and important feature of the present invention lies in so constructing the stand that it is of sufficient strength to safely withstand the load of the hobby horse and a rider thereon, such as a child, and further withstand the heavy shock loads which are created by rocking and oscillating the horse with a rider thereon, and in addition, providing the stand with sufficient resilience to operate against the springs the action of the springs operating to dampen very high amplitude oscillations of the horse. This dampening of the oscillations when the oscillations reach a very high amplitude provides a safety factor whereby a child riding the horse will not be permitted to rock the horse so violently that he will throw himself from the horse and thereby injure himself.

The resilience of the base frame of the present invention is provided partly in the material utilized, but more extensively in the unique configuration of the stand which has off-set intermediate portions in each of the frame members so that the ends of the stand will have a vertical resilience while upturned end portions on the frame members and the supporting spring suspended horse will have substantially universal resilience. The combination of these features will be operative to dampen excessively high amplitude oscillations of the horse for safety purposes and will permit normal oscillations etc. to be continued substantially unimpaired.

Still other objects, features and advantages of the present invention will become readily apparent from the following detailed description of the present invention, from the claims, and from the drawings in which each and every detail shown is fully disclosed as a part of this specification, in which like reference numerals refer to like parts, and in which:

Figure 1 is a side elevational view of a base stand embodying the principles of the present invention and shown with a phantom outlined spring suspended hobby horse mounted thereon;

Figure 2 is a plan view of the base stand of Figure 1; and

Figure 3 is a plan view of the stand showing the same in a position assembled for storage and shipment thereof etc.

As illustrated in Figure 1, a base stand 10 incorporating the principles of the present invention is operable to support a hobby horse 11 or the like of the spring suspended variety and which may be suspended by such springs as the coil springs 12—12. In actual practice there would be four such springs 12 each of which would be attached by any convenient means such as hooks or eyes or the like to the horse or to bars 13—13 extending therethrough. The other ends of the springs would be hooked or otherwise secured to the base stand 10. Said other ends of the springs 12 are respectively hooked to the base stand or frame at a position thereon whereby the springs will be operative to resiliently support and suspend the hobby horse 11.

The base frame stand 10 is constructed from a pair of preferably symmetrical or identical frame members 14 and 15 which are provided with upstanding end portions or legs 16, 17, 18 and 19 respectively. At the upper extremity of each of the legs or end portions 16 through 19 the frame members are provided with means such as apertures therein or rings or the like 20—20 thereon to receive and support said other end of each of the springs 12—12.

Between their end portions the frame members 14 and 15, are provided with intermediate portions 21 and 22 respectively which are off-set from the general plane of the legs or upstanding end portions of each thereof respectively. These intermediate portions 21 and 22 include portions thereof such as the very central portions 23 and 24 respectively which are substantially parallel to the planes of the legs and, when the frame members are secured together to form a base frame stand for a spring mounted hobby horse, are disposed along the longitudinal center of the base frame stand 10. Transversely extending portions 25, 26 and 27, 28 of each of the frame members 14 and 15 extend from the central portions 23 and 24 to the upstanding portions or legs 16 through 19.

By this construction each of the frame members 14 and 15 is preferably an integral structure formed from a single length of metal tubing or pipe or rod stock or bar stock or the like, which may be chrome-plated or wrought-iron black painted or otherwise finished as desired, and which has a pair of end portions which are bent upwardly as at 29, 30 and 31, 32 respectively, and intermediate portions which are bent as at 33, 34 and 35, 36, respectively, to provide the same with longitudinally extending central portions and transversely extending portions in the intermediate portions between the upstanding legs.

With the frame sections or frame members configured in this manner, they may be substantially identical whereby they may each be formed on the same jig or in a continuous forming process which will permit maximum economy in frame construction. Two frame members or frame sections are therefore sufficient to form a complete base stand such as illustrated in Figures 1 and 2 and these will be secured together in any convenient manner such as by bolts and nuts 37 and 38 which are passed through appropriate apertures in the central portions 23 and 24 of the intermediate portions 21 and 22 of the frame members 14 and 15. When so secured together they will form a complete frame which is fully operable to support an object such as a spring suspended hobby horse. The legs 16 through 19, in accordance with the principles of the present invention, in addition to supporting the hobby horse may also have the additional feature of being sufficiently resilient to act against large stresses on the springs 12—12 to thereby act to dampen very high amplitude oscillations in rocking movements of the horse. Thus, as an additional feature of the present invention the construction of the base frame may be such that the legs have a universally directionalized resilience which is sufficient only to dampen excessive high amplitude oscillations of the horse and tensionings of the springs while yet permitting normal operation of the horse.

This feature may be still further enhanced by configurating the frame members 14 and 15 in such a manner that the intermediate portions 21 and 22 are not only laterally off-set but also vertically off-set as indicated generally at 39. This off-set is such that when the frame members are secured together in the manner as shown in Figure 2, then the base stand or frame will have only about four point contact with a floor upon which it may rest, this contact occurring in the region of the junction between the intermediate portions and the end portions or legs, or more specifically in the region of the bends 29 through 32. With this four point contact, the intermediate portion will be off-set slightly above the floor level and therefore will provide an additional vertical resilience to the frame which will be operative to enhance the damping of excessively high amplitude oscillations of roll and pitch of the hobby horse 11.

Additional devices to stabilize the combination of the base and spring suspended hobby horse are provided by such means as rubber or the like floor engaging members 40—40 on the frame members at the low points thereof where they would engage the floor or supporting surface. These rubber or the like feet 40 may be short lengths of hose or resilient material tubing on the frame members at the described points. By gripping the floor or supporting surface they will tend to prevent "walking" of the combination hobby horse and stand as the same is operatively manipulated.

Still another distinctive feature of the invention lies in its adaptability to compact storage and shipping which is provided by the construction hereinabove described. By reversing one of the frame members from its opposed relation with respect to the another thereof so that it is juxtaposed with the other frame member in a substantially superimposed position, frame members may then be secured together as shown in Figure 3 and in contrast to the showing of Figure 2. In Figure 3 the frame member 14 has been reversed so that it lies juxtaposed to the frame member 15 along the entire length of each thereof and the securing bolts and nuts 37 and 38 have been again passed through the appropriate apertures in the frame members to secure the frame members together in this compact juxtaposed or substantially superimposed position therefor.

Thus there is provided in accordance with the principles of the present invention a base frame and stand for which many variations and modifications may be made without departing from the true spirit and scope of the novel concepts and principles of the invention. We, therefore, intend to cover all such modifications and variations as fall within the true spirit and scope of the novel concepts and principles of our invention.

We claim as our invention:

A base stand for a spring suspended hobby horse comprising a pair of identically configured frame means each having upstanding end portions and an intermediate portion laterally offset, said intermediate portion having symmetrical inwardly inclined regions adjacent the end portions, and medial parallel portions, and means to secure the frame means together at the medial portions with each inclined region being in a line offset from a diagonally opposed inclined region whereby a stable base is provided.

References Cited in the file of this patent

UNITED STATES PATENTS

| | | |
|---|---|---|
| 2,489,698 | Brown | Nov. 29, 1949 |
| 2,622,878 | Mooney | Dec. 23, 1952 |